US012746631B2

(12) United States Patent
Li et al.

(10) Patent No.: US 12,746,631 B2
(45) Date of Patent: Sep. 29, 2026

(54) FULLY-AUTOMATIC ALUMINUM THERMAL-SPRAYING CORROSION PREVENTION PRODUCTION LINE BASED ON ROBOTS AND VISUAL RECOGNITION

(71) Applicant: GUIZHOU POWER GRID CO., LTD, Guiyang (CN)

(72) Inventors: Bo Li, Guiyang (CN); Zhuoyi Liu, Guiyang (CN); Jun Liu, Guiyang (CN); Jingxin Tu, Guiyang (CN); Zhiqing Zhang, Guiyang (CN); Xi Fang, Guiyang (CN); Shifeng Liu, Guiyang (CN); Xianwu Zeng, Guiyang (CN); Dan Yang, Guiyang (CN); Jinke Lu, Guiyang (CN); Wei Du, Guiyang (CN)

(73) Assignee: GUIZHOU POWER GRID CO., LTD, Guiyang (CN)

( * ) Notice: Subject to any disclaimer, the term of this patent is extended or adjusted under 35 U.S.C. 154(b) by 664 days.

(21) Appl. No.: 18/259,781

(22) PCT Filed: Apr. 19, 2022

(86) PCT No.: PCT/CN2022/087538
§ 371 (c)(1),
(2) Date: Jun. 29, 2023

(87) PCT Pub. No.: WO2023/092931
PCT Pub. Date: Jun. 1, 2023

(65) Prior Publication Data

US 2024/0082977 A1 Mar. 14, 2024

(30) Foreign Application Priority Data

Nov. 23, 2021 (CN) ........................ 202111397405.X

(51) Int. Cl.
*B23Q 41/02* (2006.01)
*B05C 13/00* (2006.01)
(Continued)

(52) U.S. Cl.
CPC .............. *B23Q 41/02* (2013.01); *B05C 13/00* (2013.01); *C23C 4/02* (2013.01); *C23C 4/08* (2013.01)

(58) Field of Classification Search
USPC ... 118/323, 306, 317, 302, 326, 309, 35–36, 118/70, 712
See application file for complete search history.

(56) References Cited

U.S. PATENT DOCUMENTS

2009/0068495 A1* 3/2009 Dembowski ........... B23K 31/02 219/60 R

FOREIGN PATENT DOCUMENTS

CN 101469397 A 7/2009
CN 101607247 A 12/2009
(Continued)

OTHER PUBLICATIONS

English Translation CN-111334741-A (Year: 2020).*
(Continued)

*Primary Examiner* — Yewebdar T Tadesse
(74) *Attorney, Agent, or Firm* — Bayramoglu Law Offices LLC

(57) ABSTRACT

A fully-automatic aluminum thermal-spraying corrosion prevention production line based on robots and visual recognition is provided. The production line comprises an automatic feeding system comprising feeding carrying and conveying mechanisms; a laser derusting system comprising a derusting robot, a laser cleaning nozzle and derusting conveying mechanisms; an aluminum thermal-spraying system comprising an aluminum spraying robot and an alumi-
(Continued)

num thermal-spraying gun; an automatic rolling system comprising a rolling pedestal, a first rolling wheel, a second rolling wheel and a rolling drive mechanism; a laser cutting system; and a discharging and stacking system.

9 Claims, 6 Drawing Sheets

(51) Int. Cl.
*C23C 4/02* (2006.01)
*C23C 4/08* (2016.01)

(56) References Cited

FOREIGN PATENT DOCUMENTS

| | | | | | |
|---|---|---|---|---|---|
| CN | 104959263 | A | * | 10/2015 | |
| CN | 205341405 | U | * | 6/2016 | |
| CN | 106350761 | A | | 1/2017 | |
| CN | 206764144 | U | * | 12/2017 | |
| CN | 111334741 | A | * | 6/2020 | ............... C23C 4/12 |
| CN | 212681435 | U | | 3/2021 | |
| CN | 112643356 | A | * | 4/2021 | ............. B23P 23/06 |
| CN | 213763235 | U | * | 7/2021 | |
| CN | 114012510 | A | | 2/2022 | |
| CN | 114059004 | A | | 2/2022 | |
| JP | 2002212701 | A | | 7/2002 | |
| JP | 2021053617 | A | * | 4/2021 | ........... B24B 27/033 |
| WO | WO-2011006343 | A1 | * | 1/2011 | ............... B05B 9/00 |

OTHER PUBLICATIONS

English Translation CN-205341405A (Year: 2016).*
English Translation CN-206764144U (Year: 2017).*
English Translation JP-2021053617 (Year: 2021).*
English Translation WO-2011006343 (Year: 2011).*
English Translation CN-213763235-U (Year: 2021).*
English Translation CN-112643356A (Year: 2021).*
English Translation CN-104959263 (Year: 2015).*

* cited by examiner

FULLY-AUTOMATIC ALUMINUM THERMAL-SPRAYING CORROSION PREVENTION PRODUCTION LINE BASED ON ROBOTS AND VISUAL RECOGNITION

CROSS REFERENCE TO RELATED APPLICATIONS

This application is the national phase entry of International Application No. PCT/CN2022/087538, filed on Apr. 19, 2022, the entire contents of which are incorporated herein by reference.

TECHNICAL FIELD

The invention relates to a fully-automatic aluminum thermal-spraying corrosion prevention production line based on robots and visual recognition, and belongs to the technical field of aluminum spraying of workpieces.

BACKGROUND

Power line towers are important facilities of transformer substations, and the high-speed development of national power leads to an increasing higher demand for power, which makes it of great importance to guarantee safe and reliable power supply. However, the fact that the towers are generally made of steel and exposed to corrosive damage of wind, sand, rain, snow and acid water all year round, so they may be severely rusted, causing great economic losses and severe waste of production resources. At present, mature corrosion prevention techniques for metal equipment include the method of spraying protective coatings, the method of adding corrosion inhibitors, and the sacrificial cathode protective method, among which the method of spraying protective coatings is the most widely used corrosion prevention technique because it is the most economical, convenient and effective method. However, derusting and spraying are carried out manually at present, which greatly limits the treatment efficiency and makes the production cost high.

BRIEF SUMMARY OF THE INVENTION

In view of the above problems, the invention provides a fully-automatic aluminum thermal-spraying corrosion prevention production line based on robots and visual recognition, which realizes automatic laser cleaning, aluminum arc-spraying, automatic rolling and laser cutting of workpieces through robots and greatly improves the spraying quality and efficiency, thus overcoming the defects in the prior art.

The technical solution of the invention is as follows: a fully-automatic aluminum thermal-spraying corrosion prevention production line based on robots and visual recognition comprises:

An automatic feeding system comprising feeding carrying and conveying mechanisms used for conveying workpieces;

A laser derusting system comprising a derusting robot, a laser cleaning nozzle and derusting conveying mechanisms, wherein the laser cleaning nozzle is disposed on the derusting robot, and the derusting conveying mechanisms are disposed on two sides of the derusting robot and are able to receive the workpieces from the feeding carrying and conveying mechanisms;

An aluminum thermal-spraying system comprising an aluminum spraying robot and an aluminum thermal-spraying gun, wherein the aluminum spraying robot is disposed in a conveying direction of the derusting conveying mechanisms, and the aluminum thermal-spraying gun is disposed on the aluminum spraying robot;

An automatic rolling system located behind the aluminum thermal-spraying system and comprising a rolling pedestal, a first rolling wheel, a second rolling wheel and a rolling drive mechanism, wherein the first rolling wheel is rotatably disposed on the rolling pedestal, the rolling drive mechanism is disposed on the rolling pedestal, the second rolling wheel is disposed on the rolling drive mechanism, and the rolling drive mechanism is able to drive the second rolling wheel to move close to or away from the first rolling wheel;

A laser cutting system located behind the automatic rolling system and comprising a cutting robot and a laser cutting head, wherein the laser cutting head is disposed on the cutting robot and is used for cutting rolled workpieces; and A discharging and stacking system comprising discharging carrying and conveying mechanisms used for receiving cut workpieces.

In one example, the automatic feeding system further comprises feeding trusses, a feeding moving mechanism and feeding grabbing mechanisms, the feeding moving mechanism is movably disposed on the feeding trusses, and the feeding grabbing mechanisms are disposed on the feeding moving mechanism, and are used for grabbing workpieces and placing the workpieces on the feeding carrying and conveying mechanisms.

In one example, each derusting conveying mechanism comprises a derusting pedestal, derusting rollers, a first pressing wheel, a first drive mechanism, second pressing wheels and second drive mechanisms, wherein the derusting rollers are rotatably disposed on a horizontal plane of the derusting pedestal, the first pressing wheel is disposed above the derusting pedestal, the first drive mechanism is able to drive the first pressing wheel to move upwards and downwards, the second pressing wheels are disposed on two sides of the derusting pedestal, and the second drive mechanisms are able to drive the second pressing wheels on one side of the derusting pedestal to move towards the other side of the derusting pedestal.

In one example, the first rolling wheel comprises a first rolling part and a second rolling part, the first rolling part and the second rolling part are conical, and an angle matched with an external angle of angle steel is formed between the first rolling part and the second rolling part; and the second rolling wheel comprises a third rolling part and a fourth rolling part, the third rolling part and the fourth rolling part are conical, and an angle matched with an internal angle of the angle steel is formed between the third rolling part and the fourth rolling part.

In one example, the first rolling part is arranged horizontally, the second rolling part is arranged vertically, and the third rolling part and the fourth rolling part correspond to the first rolling part and the second rolling part respectively.

In one example, each feeding carrying and conveying mechanism comprises a feeding pedestal and feeding drive rollers, wherein the feeding drive rollers are disposed on the feeding pedestal and are able to drive the workpieces to move forwards.

In one example, the discharging and stacking system further comprises transfer mechanisms, discharge trusses, a discharging moving mechanism and discharging grabbing mechanisms, the transfer mechanisms are able to convey the workpieces on the discharging carrying and conveying mechanisms one-by-one, the discharging moving mechanism is movably mounted on the discharging trusses, the discharging grabbing mechanisms are mounted on the discharging moving mechanism, and the discharging grabbing mechanisms are used for discharging the workpieces from the discharging carrying and conveying mechanisms and stacking the workpieces.

In one example, each discharging carrying and conveying mechanism comprises a discharging pedestal and a discharging roller, wherein the discharging drive roller is disposed on the discharging pedestal and is able to drive the workpieces to move forwards.

In one example, each transfer mechanism comprises a transfer frame, a chain conveying mechanism and a transfer lifting mechanism, wherein the chain conveying mechanism has an end hinged to the top of the transfer frame and an end hinged to the top of the transfer lifting mechanism, and the transfer lifting mechanism and the transfer frame are located on two sides of the corresponding chain conveying mechanism respectively.

In one example, dust hoods are disposed on the laser derusting system, the aluminum thermal-spraying system, the automatic rolling system, the laser cutting system and the discharging and stacking system respectively, and are connected to a negative-pressure dust emission system.

The invention has the following beneficial effects: the fully-automatic aluminum thermal-spraying corrosion prevention production line based on robots and visual recognition provides a fully-automatic intelligent production scheme for automatic laser cleaning, automatic aluminum thermal-spraying and automatic rolling of angle steel/flat steel, has the functions of automatic feeding, automatic conveying, automatic laser cleaning, automatic aluminum thermal-spraying, automatic rolling, automatic cutting and automatic stacking, can be equipped with an intelligent production line control system such as a data-based intelligent manufacturing and information-based management and control platform, greatly improves the cleaning and aluminum spraying efficiency of angle steel/flat steel, reduces the production cost, and has good economic benefits.

DETAILED DESCRIPTION OF THE INVENTION

Figure 1:
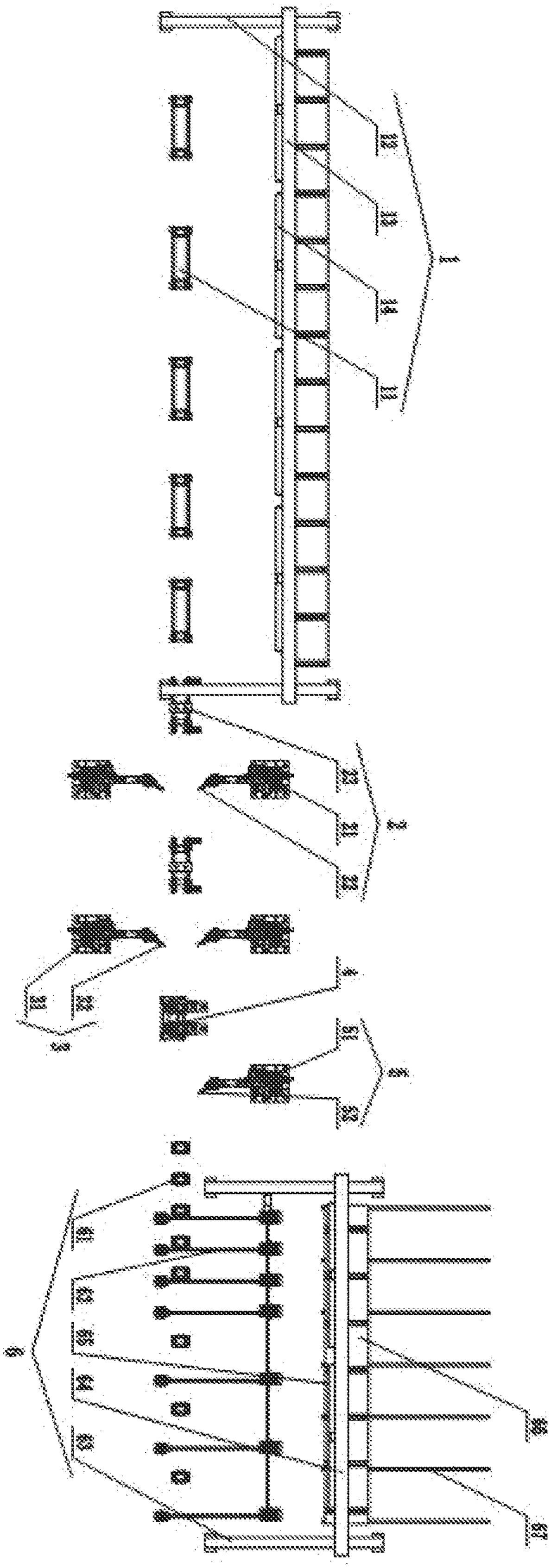
FIG. 1 is an overall layout diagram of a fully-automatic aluminum thermal-spraying corrosion prevention production line based on robots and visual recognition.

A description of reference symbols used in the FIGS. are as follows:

1, automatic feeding system;

11, feeding carrying and conveying mechanism; 12, feeding truss; 13, feeding moving mechanism; 14, feeding grabbing mechanism;

111, feeding pedestal; 112, feeding drive roller;

2, laser derusting system;

21, derusting robot; 22, laser cleaning nozzle; 23, derusting conveying mechanism;

231, derusting pedestal; 232, derusting roller; 233, first pressing wheel; 234, first drive mechanism; 235, second pressing wheel; 236, second drive mechanism; 237, derusting frame; 238, derusting wheel carrier;

3, aluminum thermal-spraying system;

31, aluminum spraying robot; 32, aluminum thermal-spraying gun;

4, automatic rolling system;

41, rolling pedestal; 42, first rolling wheel; 43, second rolling wheel; 44, rolling drive mechanism; 45, rolling frame; 46, rolling wheel carrier;

421, first rolling part; 422, second rolling part;

431, third rolling part; 432, fourth rolling part;

5, laser cutting system;

51, cutting robot; 52, laser cutting head;

6, discharging and stacking system;

61, discharging carrying and conveying mechanism; 62, transfer mechanism; 63, discharging truss; 64, discharging moving mechanism; 65, discharging grabbing mechanism; 66, stacking frame; 67, discharging rail;

611, discharging pedestal; 612, discharging drive roller;

621, transfer support; 622, chain conveying mechanism; 623, transfer lifting mechanism.

To make the above purposes, features and advantages of the invention easily understood, the specific implementation of the invention will be described in detail below in conjunction with accompanying drawings. Many specific details are expounded in the following description to gain a full understanding of the invention. The invention can be implemented in many other ways different from those described here. Those skilled in the art can make similar improvements without departing from the contents of the invention, so the invention is not limited to the specific implementations disclosed below.

Referring to FIGS. 1-9, this embodiment provides a fully-automatic aluminum thermal-spraying corrosion prevention production line based on robots and visual recognition, which comprises an automatic feeding system 1, a laser derusting system 2, an aluminum thermal-spraying system 3, an automatic rolling system 4, a laser cutting system 5, and a discharging and stacking system 6.

Figure 2:
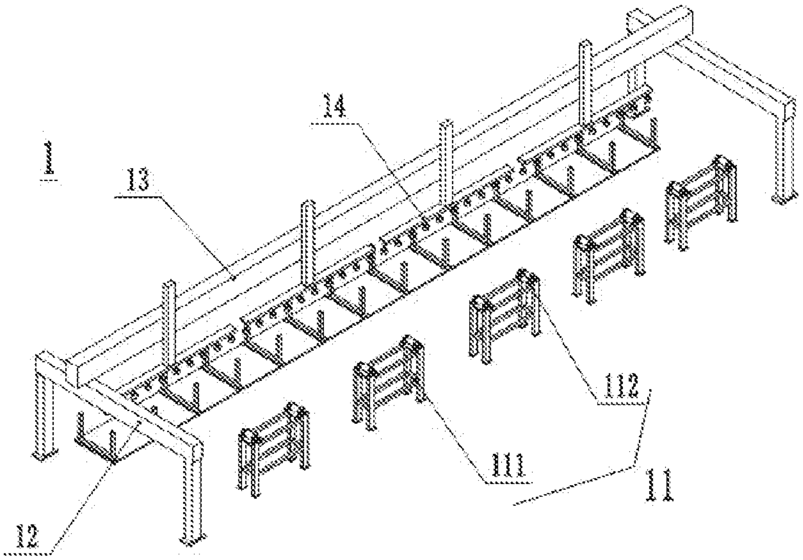
FIG. 2 is a schematic diagram of an automatic feeding system.
Figure 3:
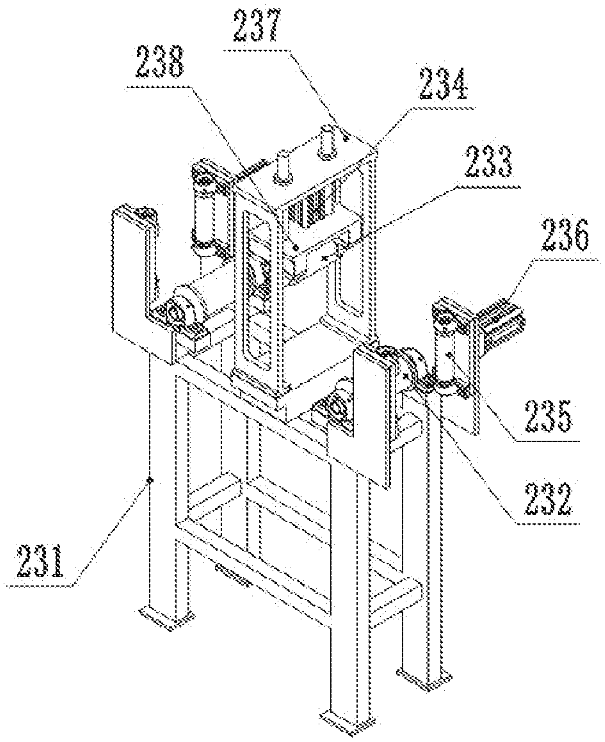
FIG. 3 is a schematic diagram of a derusting conveying mechanism from one perspective.
Figure 4:
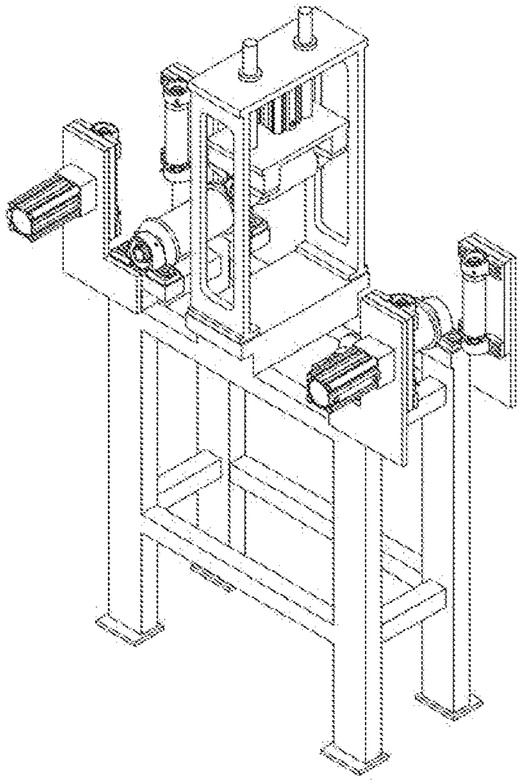
FIG. 4 is a schematic diagram of the derusting conveying mechanism from another perspective.
Figure 5:
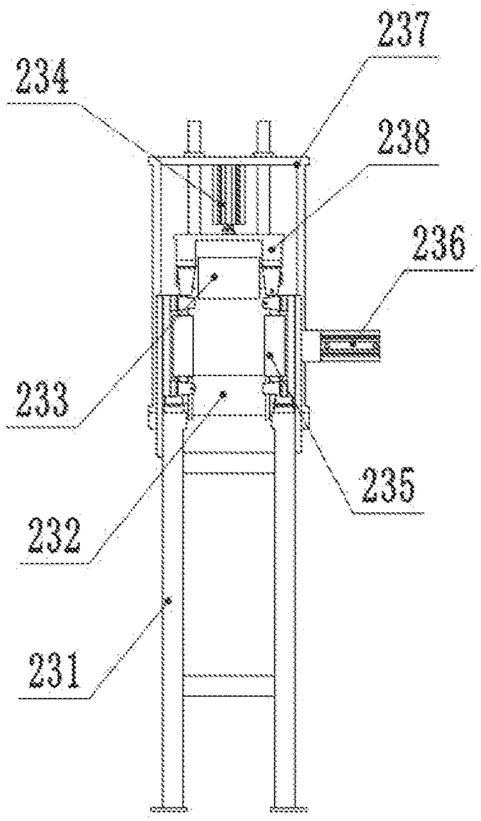
FIG. 5 is a side view of the derusting conveying mechanism (in the conveying direction)
Figure 6:
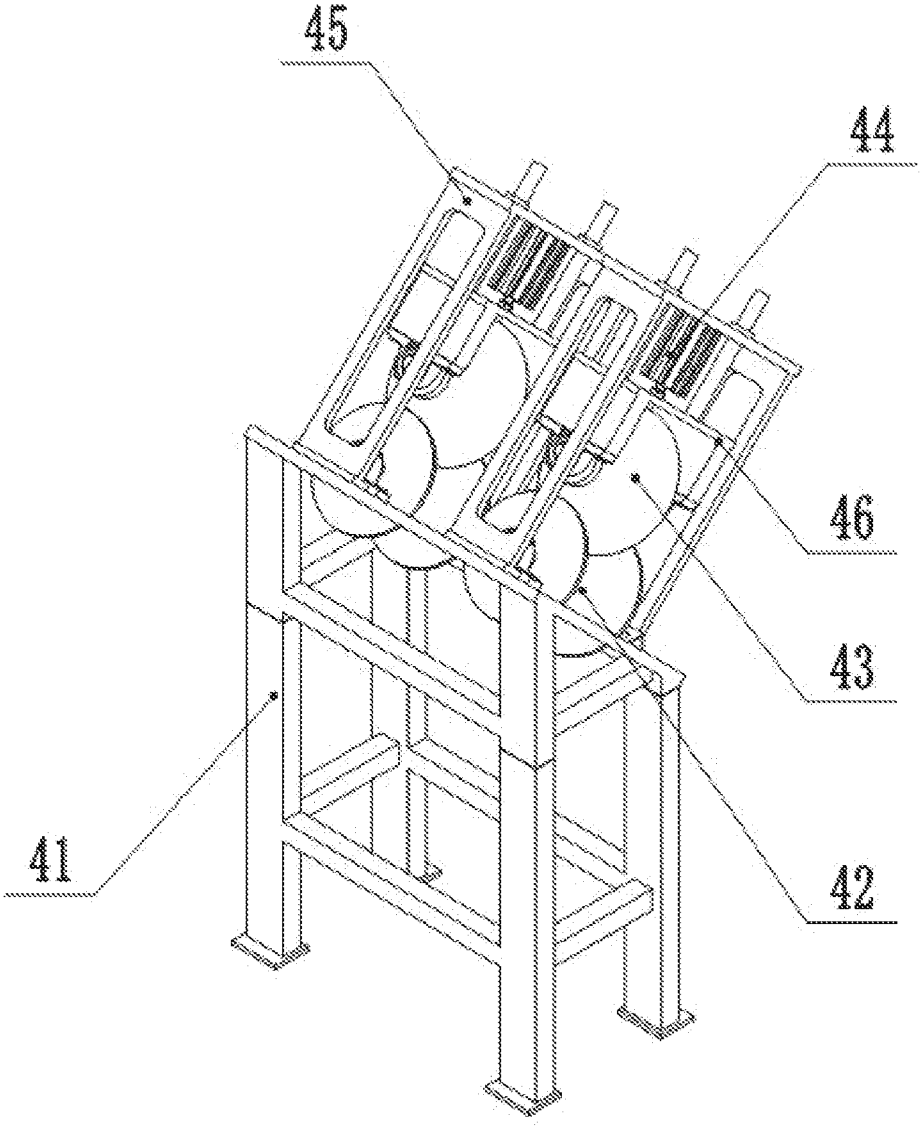
FIG. 6 is a schematic diagram of an automatic rolling system from one perspective.
Figure 7:
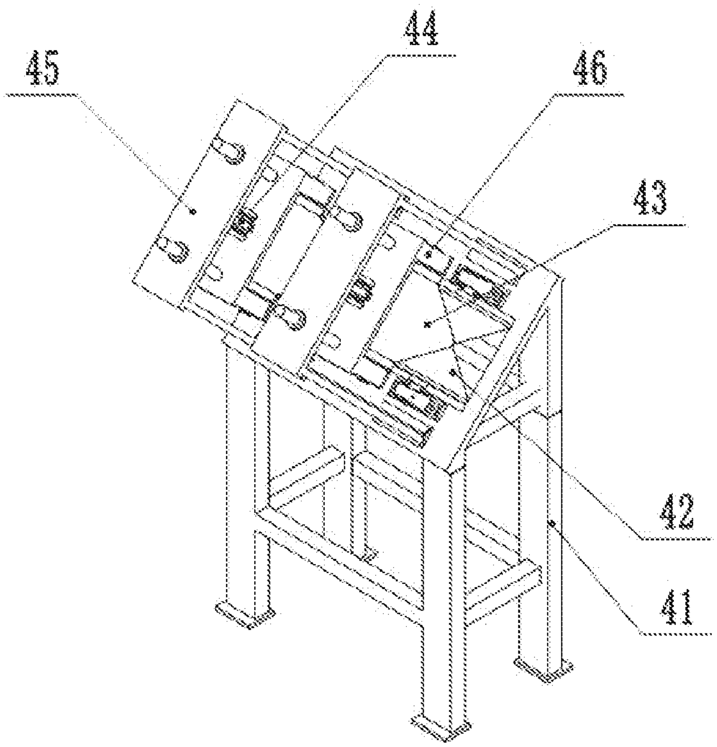
FIG. 7 is a schematic diagram of the automatic rolling system from another perspective.
Figure 8:
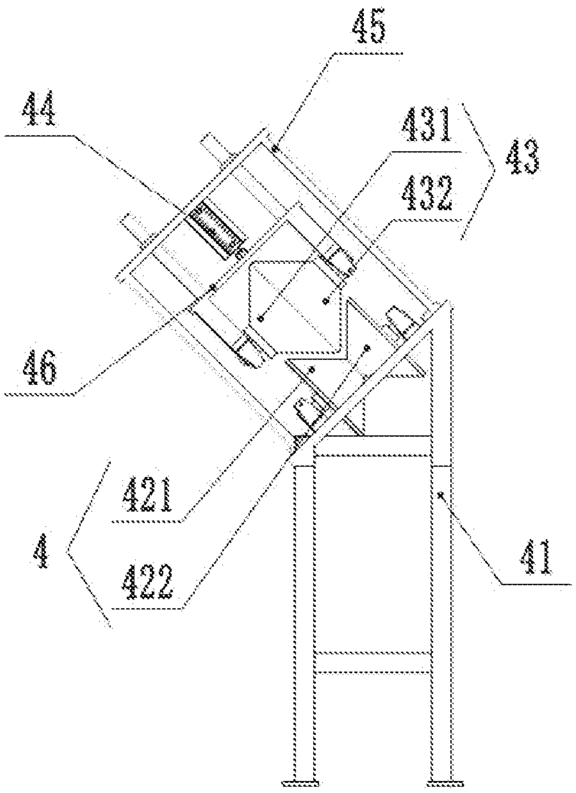
FIG. 8 is a side view of the automatic rolling system (in the conveying direction)

Referring to FIGS. 1 and 2, the automatic feeding system 1 is used for automatically pushing workpieces into a production line conveying system to complete automatic feeding, and comprises feeding carrying and conveying mechanisms 11 used for conveying the workpieces. In this embodiment, the workpieces may be flat steel/angle steel; when conveyed, the workpieces are flatly placed on the feeding carrying and conveying mechanisms, wherein one side of the angle steel is horizontal, and the other side of the angle steel is vertical.

Specifically, still with reference to FIGS. 1 and 2, the feeding carrying and conveying mechanism 11 comprises a feeding pedestal 111 and feeding drive rollers 112, wherein the feeding drive rollers 112 are rotatably mounted on the feeding pedestal 111 and are able to drive workpieces to move forwards. In the operating state, the workpieces are placed on the feeding drive rollers 112 and are driven by the feeding drive rollers 112 to move forwards continuously.

Specifically, with further reference to FIGS. 1 and 2, the automatic feeding system 1 further comprises feeding trusses 12, a feeding moving mechanism 13 and feeding grabbing mechanisms 14, wherein the feeding moving mechanism 13 is movably mounted on the feeding trusses 12, and the feeding grabbing mechanisms 14 are mounted on the feeding moving mechanism 13, and are used for grabbing workpieces and placing the workpieces on the feeding carrying and conveying mechanisms 11. In this embodiment, the feeding grabbing mechanisms 14 may be electromagnetic chucks, and a plurality of electromagnetic chucks suck the surface of workpieces to grab the workpieces. In the operating state, the feeding moving mechanism 13 moves along the feeding trusses 12 to be located above a stacking frame, and then drives the feeding grabbing mechanisms 14 to move downwards, the feeding grabbing mechanisms 14 grab workpieces and are then driven by the feeding moving mechanism 13 to move upwards along the feeding trusses 12 to be located above the feeding drive rollers 112, and finally, the feeding grabbing mechanisms 14 place the workpieces on the feeding drive rollers 112, such that automatic feeding is realized.

As shown in FIG. 1, the laser derusting system 2 is mainly used for cleaning the surfaces of workpieces. The laser derusting system 2 comprises a derusting robot 21, a laser cleaning nozzle 22 and derusting conveying mechanisms 23, wherein the laser cleaning nozzle 22 is mounted on the derusting robot 21, and the derusting conveying mechanisms 23 are mounted on two sides of the derusting robot 21 and are able to receive workpieces from the feeding carrying and conveying mechanisms. In the operating state, the feeding drive rollers 112 drive workpieces to move onto the derusting conveying mechanisms 23, and during the moving process, the derusting robot 21 controls the laser cleaning nozzle 22 to perform derusting on the surface of the workpieces. In this embodiment, one derusting robot 21 is mounted on each of two sides of the derusting conveying mechanisms 23, such that derusting can be performed on the workpieces from two sides at the same time, and derusting of all the surfaces of the workpieces can be completed at a time.

Laser cleaning, as a new technique based on interaction between laser and substances, can apply ultrahigh-peak and short-pulse laser to workpieces, dirt, rust or coatings on the surface of the workpieces absorb the laser to be evaporated or stripped instantly, while the workpieces hardly absorb the laser, such that the dirt on the surface of the workpieces is removed without causing damage to base materials. Compared with traditional cleaning methods, laser cleaning is a high-quality, high-efficiency, energy-saving and environmentally-friendly new cleaning process, and has the following advantages: 1, laser cleaning is safe and free of contact, and will not cause damage to base materials; 2, cleaning is accurate and controllable, the cleaning area can be selected, and micro-level accuracy control can be realized in the thickness direction; 3, the comprehensive cost is low, no consumable is used by laser cleaning equipment, and only electric energy is consumed; and 4, the applicability and flexibility are high, and integration and automation can be realized easily.

Specifically, with reference to FIGS. 1 and 3-5, the derusting conveying mechanism 23 comprises a derusting pedestal 231, derusting rollers 232, a first pressing wheel 233, a first drive mechanism 234, second pressing wheels 235 and second drive mechanisms 236, wherein the derusting rollers 232 are rotatably mounted on a horizontal plane of the derusting pedestal 231, the first pressing wheel 233 is rotatably mounted above the derusting pedestal 231, the first drive mechanism 234 is able to drive the first pressing wheel 233 to move upwards and downwards, the second pressing wheels 235 are mounted on two sides of the derusting pedestal 231, and the second drive mechanisms 236 are able to drive the second pressing wheels 235 on one side of the derusting pedestal 231 to move towards the other side of the derusting pedestal 231. In the operating state, workpieces from the feeding drive rollers 112 are driven by the derusting rollers 232 to continue to move forwards, during the moving process of the workpieces, the first pressing wheel 233 is driven by the first drive mechanism 234 to move downwards to abut against the upper surface of the workpieces, and the second drive mechanisms 236 drive the second pressing wheels 235 one side to move horizontally to fix the position of the workpieces, such that the workpieces are prevented from shaking, which may otherwise affect the cleaning effect, and more importantly, the position of the workpieces is calibrated in advance for subsequent automatic rolling of the workpieces. It should be noted that, when the workpieces are angle steel, the bottom of the horizontal side of the angle steel is placed on the derusting rollers 232, the top of the angle steel presses against and contacts the first pressing wheel 233, and the vertical side of the angle steel is pushed by the second pressing wheels 235 to a preset position in the horizontal direction. In this embodiment, the first drive mechanism 234 and the second drive mechanisms 236 may be hydraulic cylinders, wherein a base of the first drive mechanism 234 is mounted on a derusting frame 237, a free end of a telescopic rod of the first drive mechanism 234 is connected to a derusting wheel carrier 238, a guide rod is mounted between the derusting wheel carrier 238 and the derusting frame 237, the axial direction of the guide rod is the same as the moving direction of the first pressing wheel 233, and the first pressing wheel 233 is mounted on the derusting wheel carrier 238.

Referring back to FIG. 1, the aluminum thermal-spraying system 3 is mainly used for performing aluminum arc thermal spraying on the surfaces of workpieces. The aluminum thermal-spraying system 3 comprises an aluminum spraying robot 31 and an aluminum thermal-spraying gun 32, wherein the aluminum spraying robot 31 is mounted in a conveying direction of the derusting conveying mechanisms 23, and the aluminum thermal-spraying gun 32 is mounted on the aluminum spraying robot 31. In the operating state, when workpieces move forwards to the aluminum spraying robot 31, the aluminum spraying robot 31 controls the aluminum thermal-spraying gun 32 to perform aluminum arc thermal spraying on the surface of the workpieces. In this embodiment, one aluminum spraying robot 31 is mounted on each of the two sides in the conveying direction of the workpieces, such that aluminum arc thermal spraying can be performed on the workpieces from two sides at the same time, and aluminum spraying of all the surfaces of the workpieces can be completed at a time.

The system adopts the aluminum arc thermal spraying process, which melts metal by means of an electric arc burning between two continuously fed metal wires, atomizes the molten metal by means of a high-speed air flow, and accelerates atomized metal particles to enable them be sprayed toward a workpiece to form a coating. Arc spraying is a thermal spraying method commonly used in actual application such as corrosion prevention, abrasion prevention and maintenance of mechanical parts of steel structures. Compared with flame spraying, arc spraying has the following advantages: 1, the heat efficiency is high: the heat utilization rate of flame spraying is only 5%-10%, and the utilization rate of electric energy of arc spraying can reach 60%-70%; 2, the production efficiency is higher: the production efficiency of the arc spraying technique is high, which is generally over three times that of flame spraying; 3, the bonding strength of coatings is high: through arc spraying, high bonding strength can be obtained without increasing the temperature of workpieces or using precious base metal; 4, the production cost is low: the cost of arc spraying is 30% lower than that of flame spraying; 5, operation is easy, safe and reliable: arc spraying equipment is not provided with a complicated operating mechanism, the spraying quality can be guaranteed as long as process parameters are set within specified ranges according to different spraying materials; only electric energy and compressed air are used, inflammable gas such as oxygen and acetylene are not needed, so arc spraying is safe and reliable, and is suitable for field operation; 6, pseudo-alloy coatings can be prepared: through arc spraying, pseudo-alloy coatings can be prepared by means of two metal wires with different components, to obtain unique comprehensive performance.

Referring to FIGS. 4-8, the automatic rolling system 4 is mainly used for mechanically rolling coatings obtained through arc spraying to ensure the quality of the coatings. The automatic rolling system 4 is located behind the aluminum thermal-spraying system 3 and comprises a rolling pedestal 41, a first rolling wheel 42, a second rolling wheel 43 and a rolling drive mechanism 44, wherein the first rolling wheel 42 is rotatably mounted on the rolling pedestal 41, the rolling drive mechanism 44 is mounted on the rolling pedestal 41, the second rolling wheel 43 is mounted on the rolling drive mechanism 44, and the rolling drive mechanism 44 is able to drive the second rolling wheel 43 to move close to or away from the first rolling wheel 42. In the operating state, workpieces conveyed from the derusting conveying mechanism 23 move between the first rolling wheel 42 and the second rolling wheel 43, and during the moving process, the rolling drive mechanism 44 drives the second rolling wheel 43 to move downwards to abut against one surface of the workpieces, such that arc spray coatings of the workpiece are mechanically rolled from top and bottom respectively, and the quality of the coatings is guaranteed. In this embodiment, the rolling drive mechanism 44 is a hydraulic cylinder, and is provided with a base mounted on a rolling frame 45 and a telescopic rod having a free end connected to a rolling wheel carrier 46, a guide rod is mounted between the rolling wheel carrier 46 and the rolling frame 45, the axial direction of the guide rod is the same as the moving direction of the second rolling wheel 43, and the second rolling wheel 43 is mounted on the rolling wheel carrier 46.

Specifically, referring to FIGS. 4-8, the first rolling wheel 42 comprises a first rolling part 421 and a second rolling part 422, the first rolling part 421 and the second rolling part 422 are conical, and an angle matched with an external angle of angle steel is formed between the first rolling part 421 and the second rolling part 422; and the second rolling wheel 43 comprises a third rolling part 431 and a fourth rolling part 432, the third rolling part 431 and the fourth rolling part 432 are conical, and an angle matched with an internal angle of the angle steel is formed between the third rolling part 431 and the fourth rolling part 432. When the workpieces are flat steel, the bottom of the flat steel presses against and contacts the first rolling part 421, and the top of the flat steel presses against and contacts the third rolling part 431. When the workpieces are angle steel, the horizontal bottom of the angle steel presses against and contacts the first rolling part 421, the horizontal top of the angle steel presses against and contacts the third rolling part 431, an inner side of the vertical face of the angle steel presses against and contacts the fourth rolling part 432, and the outer side of the vertical face of the angle steel presses against and contacts the third rolling part 431, such that all the surfaces of the angle steel are mechanically rolled at a time.

Specifically, still referring to FIGS. 4-8, the first rolling part 421 is arranged horizontally, the second rolling part 422 is arranged vertically, and the third rolling part 431 and the fourth rolling part 432 correspond to the first rolling part 421 and the second rolling part 422 respectively, such that both flat steel and angle steel can be comprehensively rolled without changing a mold. In this embodiment, an upper end face of the rolling pedestal 41 is inclined by 45°, and the rolling frame 45 is perpendicular to the inclined end face.

Referring to FIG. 1, the laser cutting system 5 is mainly used for cutting workpieces. The laser cutting system 5 is located behind the automatic rolling system 4 and comprises a cutting robot 51 and a laser cutting head 52, wherein the laser cutting head 52 is disposed on the cutting robot 51 and is used for cutting rolled workpieces. In the operating state, when workpieces move in front of a laser frame by a preset distance, the laser cutting head 52 cuts the workpieces by a fixed length.

Referring to FIG. 1, he discharging and stacking system 6 is used for discharging workpieces, and comprises discharging carrying and conveying mechanisms 61 used for receiving cut workpieces.

Figure 9:
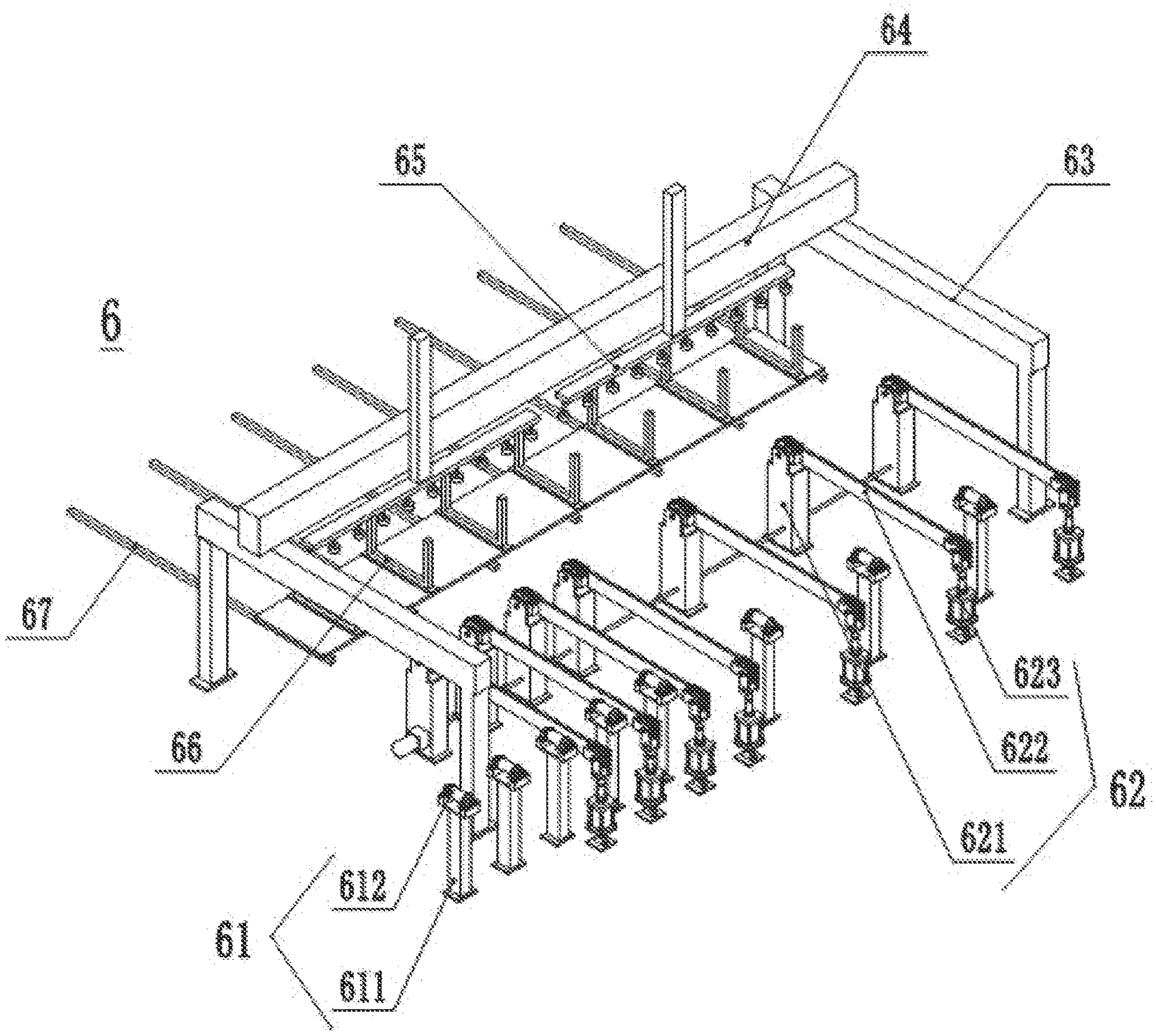
FIG. 9 is a schematic diagram of a discharging and stacking system.

Specifically, referring to FIGS. 1 and 9, the discharging carrying and conveying mechanism 61 comprises a discharging pedestal 611 and a discharging drive roller 612, wherein the discharging drive roller 612 is disposed on the discharging pedestal 611 and is able to drive workpieces to move forwards. In the operating state, workpieces move onto the discharging drive roller 612 after being cut, and are driven by the discharging drive roller 612 to move forwards continuously.

Specifically, still referring to FIGS. 1 and 9, the discharging and stacking system 6 further comprises transfer mechanisms 62, discharge trusses 63, a discharging moving mechanism 64 and discharging grabbing mechanisms 65, wherein the transfer mechanisms 62 are able to convey the workpieces on the discharging carrying and conveying mechanisms 61 one-by-one, the discharging moving mechanism 64 is movably mounted on the discharging trusses 63, the discharging grabbing mechanisms 65 are mounted on the discharging moving mechanism 64, and the discharging grabbing mechanisms 65 are used for discharging the workpieces from the discharging carrying and conveying mechanisms 61 and stacking the workpieces. In the operating state, the discharging moving mechanism 64 moves along the discharging trusses 63 to be located above the discharging drive rollers 612, and then drives the discharging grabbing mechanisms 65 to move downwards, the discharging grabbing mechanisms 65 grab workpieces and are then driven by the discharging moving mechanism 64 to move upwards along the discharging trusses 63 to be located above a stacking frame 66, and finally, the discharging grabbing mechanisms 65 place the workpieces in the stacking frame 66, which is pushed out along a discharging rail 67 when full of workpieces.

Specifically, still referring to FIGS. 1 and 9, the transfer mechanism 62 comprises a transfer frame 621, a chain conveying mechanism 622 and a transfer lifting mechanism 623, wherein the chain conveying mechanism 622 has an end hinged to the top of the transfer frame 621 and an end hinged to the top of the transfer lifting mechanism 623, and the transfer lifting mechanism 623 and the transfer frame 621 are located on two sides of the discharging carrying and conveying mechanism 61 respectively. In the operating state, a workpiece is moved onto the discharging drive roller 612 after being cut, the transfer lifting mechanism 623 drives the chain conveying mechanism 622 at this end to move upwards to jack the workpiece placed on the discharging drive roller 612, then the workpiece is driven by the chain conveying mechanism 622 to move forwards to leave the discharging drive roller 612, then the transfer lifting mechanism 623 drives the chain conveying mechanism 622 to move downwards to be located below the discharging drive roller 612 to wait for the next workpiece, and in this way, workpieces are continuously transferred to the end close to the transfer frame 621.

To discharge exhaust gas timely, dust hoods are disposed on the laser derusting system 2, the aluminum thermal-spraying system 3, the automatic rolling system 4, the laser cutting system 5 and the discharging and stacking system 6 respectively, and are connected to a negative-pressure dust emission system.

Referring to FIGS. 1-9, the production process of the fully-automatic aluminum thermal-spraying corrosion prevention production line based on robots and visual recognition is as follows: workpieces placed in a stacking frame are grabbed by the feeding grabbing mechanisms one-by-one and placed on the feeding drive rollers 112, then the workpieces are driven by the feeding drive rollers 112 to move forwards to enter the derusting conveying mechanisms 23 and are limited and fixed, and during the moving process of the workpieces, the derusting robot 21 controls the laser cleaning nozzle 22 to perform derusting treatment on the surface of the workpieces; after being subjected to derusting treatment, the workpieces continue to move, and in this process, the aluminum spraying robot 31 controls the aluminum thermal-spraying gun 32 to perform aluminum arc thermal spraying on the surface of the workpieces; and after aluminum spraying is completed, the workpieces move between the first rolling wheel 42 and the second rolling wheel 43 to be mechanically rolled, then continue to move forwards, and are cut by the laser cutting system 5 by a fixed length when moving onto the discharging drive rollers 612 by a preset distance, and finally, the workpieces are discharged by the discharging and stacking system 6 to be stored.

The fully-automatic aluminum thermal-spraying corrosion prevention production line based on robots and visual recognition provides a fully-automatic intelligent production scheme for automatic laser cleaning, automatic aluminum thermal-spraying and automatic rolling of angle steel/flat steel, has the functions of automatic feeding, automatic conveying, automatic laser cleaning, automatic aluminum thermal-spraying, automatic rolling, automatic cutting and automatic stacking, can be equipped with an intelligent production line control system such as a data-based intelligent manufacturing and information-based management and control platform, greatly improves the cleaning and aluminum spraying efficiency of angle steel/flat steel, reduces the production cost, and has good economic benefits.

The above embodiments express several implementations of the invention and are specifically described in detail, but these embodiments should not be construed as limiting the patent scope of the invention. It should be pointed out that various modifications and improvements can be made by those ordinarily skilled in the art without departing from the concept of the invention, and all these modifications and improvements fall within the protection scope of the invention. Therefore, the protection scope of the invention should be defined by the appended claims.

What is claimed is:

1. A fully-automatic aluminum thermal-spraying corrosion prevention production line based on robots and visual recognition, comprising:

an automatic feeding system comprising feeding carrying and conveying mechanisms used for conveying workpieces;

a laser derusting system comprising a derusting robot, a laser cleaning nozzle and derusting conveying mechanisms, wherein the laser cleaning nozzle is disposed on the derusting robot, and the derusting conveying mechanisms are disposed on two sides of the derusting robot and are able to receive the workpieces from the feeding carrying and conveying mechanisms;

an aluminum thermal-spraying system comprising an aluminum spraying robot and an aluminum thermal-spraying gun, wherein the aluminum spraying robot is disposed in a conveying direction of the derusting conveying mechanisms, and the aluminum thermal-spraying gun is disposed on the aluminum spraying robot;

an automatic rolling system located behind the aluminum thermal-spraying system and comprising a rolling pedestal, a first rolling wheel, a second rolling wheel and a rolling drive mechanism, wherein the first rolling wheel is rotatably disposed on the rolling pedestal, the rolling drive mechanism is disposed on the rolling pedestal, the second rolling wheel is disposed on the rolling drive mechanism, and the rolling drive mechanism is able to drive the second rolling wheel to move close to or away from the first rolling wheel;

a laser cutting system located behind the automatic rolling system and comprising a cutting robot and a laser cutting head, wherein the laser cutting head is disposed on the cutting robot and is used for cutting rolled workpieces;

a discharging and stacking system comprising discharging carrying and conveying mechanisms used for receiving cut workpieces; and wherein each said derusting conveying mechanism comprises a derusting pedestal, derusting rollers, a first pressing wheel, a first drive mechanism, second pressing wheels and second drive mechanisms, the derusting rollers are rotatably disposed on a horizontal plane of the derusting pedestal, the first pressing wheel is disposed above the derusting pedestal, the first drive mechanism is able to drive the first pressing wheel to move upwards and downwards, the second pressing wheels are disposed on two sides of the derusting pedestal, and the second drive mechanisms are able to drive the second pressing wheels on one side of the derusting pedestal to move towards the other side of the derusting pedestal.

2. The fully-automatic aluminum thermal-spraying corrosion prevention production line based on robots and visual recognition according to claim 1, wherein the automatic feeding system further comprises feeding trusses, a feeding moving mechanism and feeding grabbing mechanisms, the feeding moving mechanism is movably disposed on the feeding trusses, and the feeding grabbing mechanisms are disposed on the feeding moving mechanism, and are used for grabbing workpieces and placing the workpieces on the feeding carrying and conveying mechanisms.

3. The fully-automatic aluminum thermal-spraying corrosion prevention production line based on robots and visual recognition according to claim 1, wherein the first rolling wheel comprises a first rolling part and a second rolling part, the first rolling part and the second rolling part are conical, and an angle matched with an external angle of angle steel is formed between the first rolling part and the second rolling part; and the second rolling wheel comprises a third rolling part and a fourth rolling part, the third rolling part and the fourth rolling part are conical, and an angle matched with an internal angle of the angle steel is formed between the third rolling part and the fourth rolling part.

4. The fully-automatic aluminum thermal-spraying corrosion prevention production line based on robots and visual recognition according to claim 3, wherein the first rolling part is arranged horizontally, the second rolling part is arranged vertically, and the third rolling part and the fourth rolling part correspond to the first rolling part and the second rolling part respectively.

5. The fully-automatic aluminum thermal-spraying corrosion prevention production line based on robots and visual recognition according to claim 1, wherein each said feeding carrying and conveying mechanism comprises a feeding pedestal and feeding drive rollers, and the feeding drive rollers are disposed on the feeding pedestal and are able to drive the workpieces to move forwards.

6. The fully-automatic aluminum thermal-spraying corrosion prevention production line based on robots and visual recognition according to claim 1, wherein the discharging and stacking system further comprises transfer mechanisms, discharge trusses, a discharging moving mechanism and discharging grabbing mechanisms, the transfer mechanisms are able to convey the workpieces on the discharging carrying and conveying mechanisms one-by-one, the discharging moving mechanism is movably mounted on the discharging trusses, the discharging grabbing mechanisms are mounted on the discharging moving mechanism, and the discharging grabbing mechanisms are used for discharging the workpieces from the discharging carrying and conveying mechanisms and stacking the workpieces.

7. The fully-automatic aluminum thermal-spraying corrosion prevention production line based on robots and visual recognition according to claim 6, wherein each said discharging carrying and conveying mechanism comprises a discharging pedestal and a discharging drive roller, and the discharging drive roller is disposed on the discharging pedestal and is able to drive the workpieces to move forwards.

8. The fully-automatic aluminum thermal-spraying corrosion prevention production line based on robots and visual recognition according to claim 7, wherein each said transfer mechanism comprises a transfer frame, a chain conveying mechanism and a transfer lifting mechanism, the chain conveying mechanism has an end hinged to a top of the transfer frame and an end hinged to a top of the transfer lifting mechanism, and the transfer lifting mechanism and the transfer frame are located on two sides of the discharging carrying and conveying mechanism respectively.

9. The fully-automatic aluminum thermal-spraying corrosion prevention production line based on robots and visual recognition according to claim 1, wherein dust hoods are disposed on the laser derusting system, the aluminum thermal-spraying system, the automatic rolling system, the laser cutting system and the discharging and stacking system respectively, and are connected to a negative-pressure dust emission system.

* * * * *